(12) United States Patent
Alfert

(10) Patent No.: US 8,752,569 B2
(45) Date of Patent: Jun. 17, 2014

(54) SHUTOFF FITTING

(75) Inventor: Franz Alfert, Möhnesee (DE)

(73) Assignee: Dominic Becker, Möhnesee (DE)

( * ) Notice: Subject to any disclaimer, the term of this patent is extended or adjusted under 35 U.S.C. 154(b) by 196 days.

(21) Appl. No.: 13/197,161

(22) Filed: Aug. 3, 2011

(65) Prior Publication Data

US 2012/0193557 A1 Aug. 2, 2012

(30) Foreign Application Priority Data

Aug. 4, 2010 (DE) .......................... 10 2010 033 438

(51) Int. Cl.
*F16K 17/36* (2006.01)
*F16K 17/40* (2006.01)

(52) U.S. Cl.
USPC .............................. 137/68.13; 251/12; 60/636

(58) Field of Classification Search
USPC .......... 137/68.11, 68.13, 68.19, 68.21, 68.22, 137/68.23; 60/636, 638, 914, 632; 89/1.14; 227/9, 10; 251/12, 26, 62, 63
See application file for complete search history.

(56) References Cited

U.S. PATENT DOCUMENTS

| | | | | |
|---|---|---|---|---|
| 3,122,154 A * | 2/1964 | Siebel et al. | ............... | 137/68.13 |
| 3,358,961 A * | 12/1967 | Montgomery et al. | .... | 137/68.13 |
| 3,373,758 A * | 3/1968 | Boutwell et al. | ........... | 137/68.13 |
| 4,815,295 A * | 3/1989 | Narum | ............................. | 60/632 |
| 5,303,631 A * | 4/1994 | Frehaut et al. | ................. | 89/1.14 |
| 5,462,307 A * | 10/1995 | Webber et al. | ................. | 280/737 |
| 5,615,912 A * | 4/1997 | O'Loughlin et al. | ......... | 280/737 |
| 6,131,594 A * | 10/2000 | Staggs et al. | ............... | 137/68.13 |
| 6,789,566 B1 | 9/2004 | Welcker | | |
| 6,886,338 B2 | 5/2005 | Fischer et al. | | |
| 7,032,778 B2 * | 4/2006 | Bock et al. | ......................... | 222/3 |
| 7,231,934 B2 * | 6/2007 | Biester | ....................... | 137/68.13 |

FOREIGN PATENT DOCUMENTS

| | | |
|---|---|---|
| DE | G 93 07 536.7 | 9/1993 |
| DE | 199 10 215 | 1/2000 |
| DE | 100 00 447 A1 | 7/2001 |
| DE | 102007062505 | 7/2009 |
| EP | 1 491 413 | 12/2004 |

* cited by examiner

*Primary Examiner* — John Rivell
(74) *Attorney, Agent, or Firm* — Henry M. Feiereisen LLC

(57) ABSTRACT

A shutoff fitting as protection device for blocking a fluid flow through a conduit includes a pneumatic adjustment device, and a hybrid gas generator operably connected to the adjustment device. The hybrid gas generator has a reaction chamber with a gas generator and a pressure gas chamber containing compressed gas and arranged adjacent to the reaction chamber. An inlet diaphragm separates the reaction chamber from the pressure gas chamber and can be penetrated, when the gas generator is activated, so that a passage is established from the reaction chamber to the pressure gas chamber. An outlet diaphragm closes the pressure gas chamber and is rendered ineffective through destruction when the gas generator is activated to enable compressed gas to flow into the adjustment device.

6 Claims, 2 Drawing Sheets

SHUTOFF FITTING

CROSS-REFERENCES TO RELATED APPLICATIONS

This application claims the priority of German Patent Application, Serial No. 10 2010 033 438.3, filed Aug. 4, 2010, pursuant to 35 U.S.C. 119(a)-(d), the content(s) of which is/are incorporated herein by reference in its entirety as if fully set forth herein.

BACKGROUND OF THE INVENTION

The present invention relates to a shutoff fitting.

The following discussion of related art is provided to assist the reader in understanding the advantages of the invention, and is not to be construed as an admission that this related art is prior art to this invention.

Shutoff fittings are provided for blocking a fluid flow through a conduit by using a shutoff element which moves from an open position to a closed position. Shutoff fittings having extremely short closing times are used in particular for immediate reliable shutoff of pipelines for gases, air, or flowable goods, e.g. as protection device in the event of a malfunction caused by rapidly reacting chemical processes. Activation of shutoff systems of this type is triggered e.g. by magnetic valves. Compressed air flows hereby from a compressed air reservoir into a drive cylinder by which the fitting is closed within milliseconds. As a result, harmful media and fire are prevented from spreading as well as propagation of pressure are effectively stopped. After activation, the shutoff fitting can then easily be actively recharged and can be validated by its destruction-free mode of operation. These systems require the presence of a respectively large compressed air reservoir and are dependent on relatively long reaction times of the magnet valves.

Pyrotechnic systems operate with a gas generator which involves electrical ignition of a solid so that reaction gases develop which spread in millisecond range and thus are also useful to trigger the desired closing mechanism. These systems have the drawback that pressure buildup of the reaction gases is not optimal for the application at hand. While hot reaction gases expanded intensely at first to rapidly move the shutoff member from an open position to a closed position. Subsequently, the reaction gas cools down, causing a contraction so that the closing pressure drops at the drive of the fitting. When improperly dimensioning the shutoff fitting, the gas volume can decrease far enough to effect an unwanted reversal, for example of the shutoff plate of a valve. As a result, reliable operation is not ensured.

It would be advantageous and desirable to provide an improved shutoff fitting to obviate prior art shortcomings.

SUMMARY OF THE INVENTION

According to one aspect of the present invention, a shutoff fitting as protection device for blocking a fluid flow through a conduit includes a pneumatic adjustment device, a hybrid gas generator operably connected to the adjustment device, the hybrid gas generator having a reaction chamber with a gas generator and a pressure gas chamber containing compressed gas and arranged adjacent to the reaction chamber, an inlet diaphragm separating the reaction chamber from the pressure gas chamber and penetratable, when the gas generator is activated, to provide a passage from the reaction chamber to the pressure gas chamber, and an outlet diaphragm closing the pressure gas chamber and rendered ineffective when the gas generator is activated so as to enable compressed gas to flow into the adjustment device.

Prior art shortcomings are resolved by coupling a pneumatic adjustment device with a hybrid gas generator. Such a hybrid gas generator includes a combustion chamber with a gas generator, and a compressed gas chamber containing compressed gas and placed adjacent the combustion chamber. The combustion chamber and the compressed gas chamber are normally separated from one another in an idle state by the inlet diaphragm but are fluidly connected in the operative state of the hybrid gas generator. Compressed gas stored in the compressed gas chamber is held in place between the inlet-side diaphragm and the outlet-side diaphragm and is able to exit only when both diaphragms are destroyed.

When the hybrid gas generator is activated, the solid of the gas generator in the combustion chamber reacts first, causing a very large gas amount to rapidly build up excess pressure in the combustion chamber, eventually destroying the inlet-side diaphragm. As a result, pressure also rises in the compressed gas chamber until the outlet-side diaphragm is destroyed. Compressed gas now exits the hybrid gas generator into the adjustment device, causing actuation of the shutoff member.

The use of hybrid gas generators for the application at hand results in a sufficiently high trigger speed as a result of the pyrotechnic release and allows a required pressure to be maintained by the addition of the reaction gas from the reaction chamber with compressed gas from the compressed gas chamber, when the gas mixture cools down following the pyrotechnic release. This prevents a spontaneous resetting of the shutoff member as a result of gas contraction, ensuring a reliable shutoff.

A shutoff fitting according to the present invention is compact, requires little maintenance, and combines the benefits of a pyrotechnic release with the benefits of a compressed gas reservoir.

As the operation of a shutoff fitting of the present invention is so sudden, measures must be taken to prevent the shutoff member from destroying its valve seat, in particular, when the pneumatic adjustment device is configured as a piston and cylinder unit. Therefore, according to another advantageous feature of the present invention, the piston and cylinder unit may have a throttle disposed in a vent channel of the piston and cylinder unit and operating as a brake to prevent the piston of the piston and cylinder unit from unimpededly moving against an end stop. The throttle builds up a resistance pressure to establish a back pressure which slows down the movement of the piston. Advantageously, the throttle can be constructed to allow buildup of a resistance pressure of at least 2.5 bar.

According to another advantageous feature of the present invention, the shutoff member can be configured as a shutoff plate and movable at an angle to a longitudinal axis of the conduit. It is also conceivable to provide the shutoff member with a closing element which is movable in longitudinal direction of the conduit.

Advantageously, the shutoff fitting can be constructed of modular configuration with exchangeable hybrid gas generator. According to another advantageous feature of the present invention, the hybrid gas generator can be constructed as pre-configured assembly which can be detachably installed in a housing of the shutoff fitting. The housing can hereby represent a separate component which is connected to the adjustment device.

Advantageously, a control channel is provided on the housing and is fluidly connected to an accumulator space of the housing for receiving gas exiting the hybrid gas generator.

The accumulator space is provided to combust the outflowing compressed gas as completely as possible before entering the cylinder of the piston and cylinder unit. For the same reason, the outflowing gas should enter the accumulator space not in axial direction but radially. The outlet opening of the accumulator space on the other hand is oriented in axial direction, i.e. the gas mixture is deflected by 90°. The presence of the control channel permits admission of compressed gas, e.g. compressed air, into the accumulator space independent from the hybrid gas generator so that the shutoff fitting can be operated with an external pressure source.

According to another advantageous feature of the present invention, the hybrid gas generator can be configured as an elongated, tubular structure and provided with an outer constriction which can be used for mounting the hybrid gas generator in the housing. This can be realized, for example, by engaging a formfitting holding element in the outer constriction. When the housing is of two-part construction with an upper housing part threadably engageable to a lower housing part, the upper housing part can be used to press the holding element against the lower housing part to reliably secure the hybrid gas generator in place. Simply unscrewing the upper housing provides access to the holding element to allow removal of the hybrid gas generator from the housing or installation of the hybrid gas generator into the housing.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
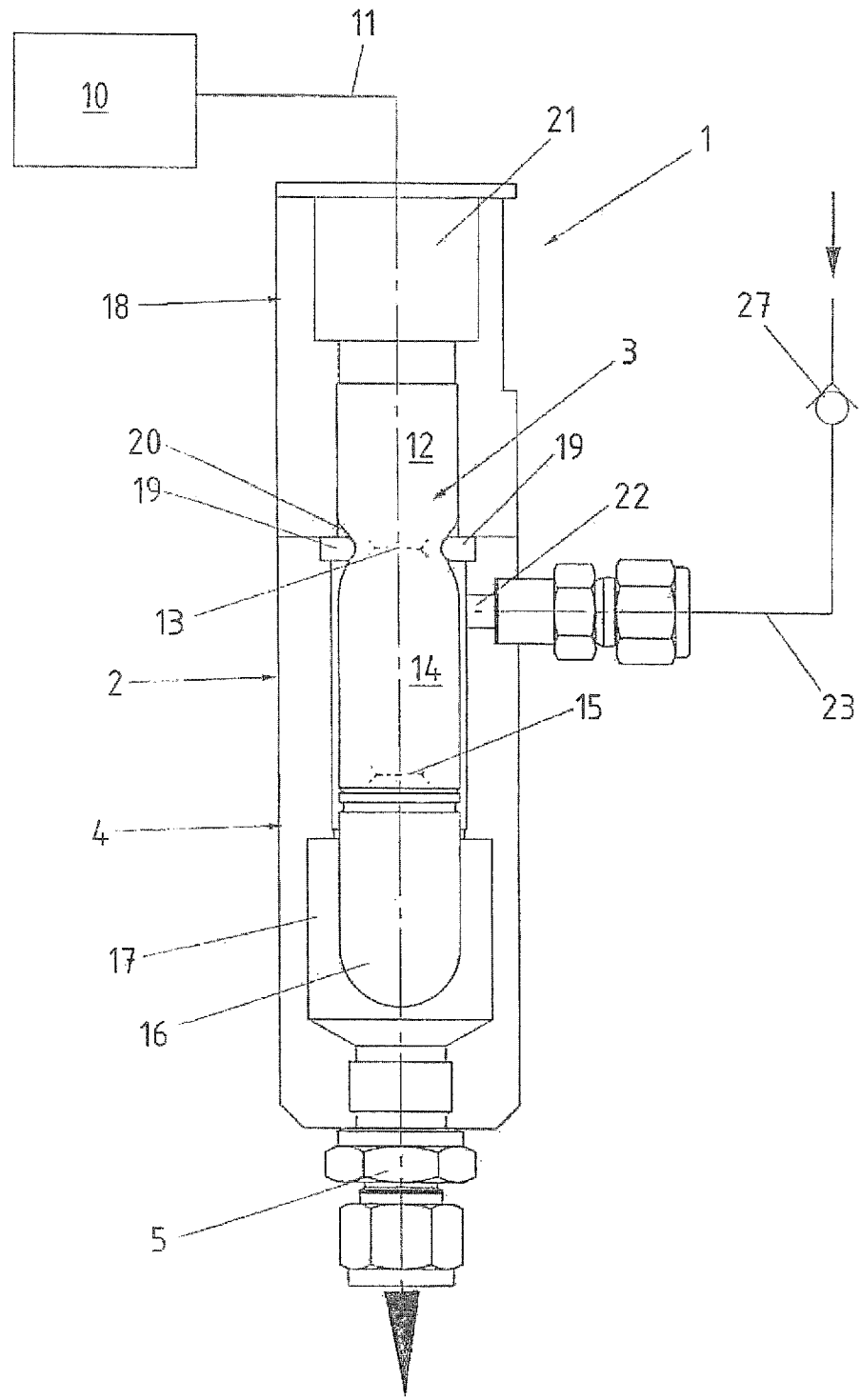
FIG. 1 is a cross sectional view of an upper portion of a drive of a shutoff fitting according to the present invention, operating as energy supply.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
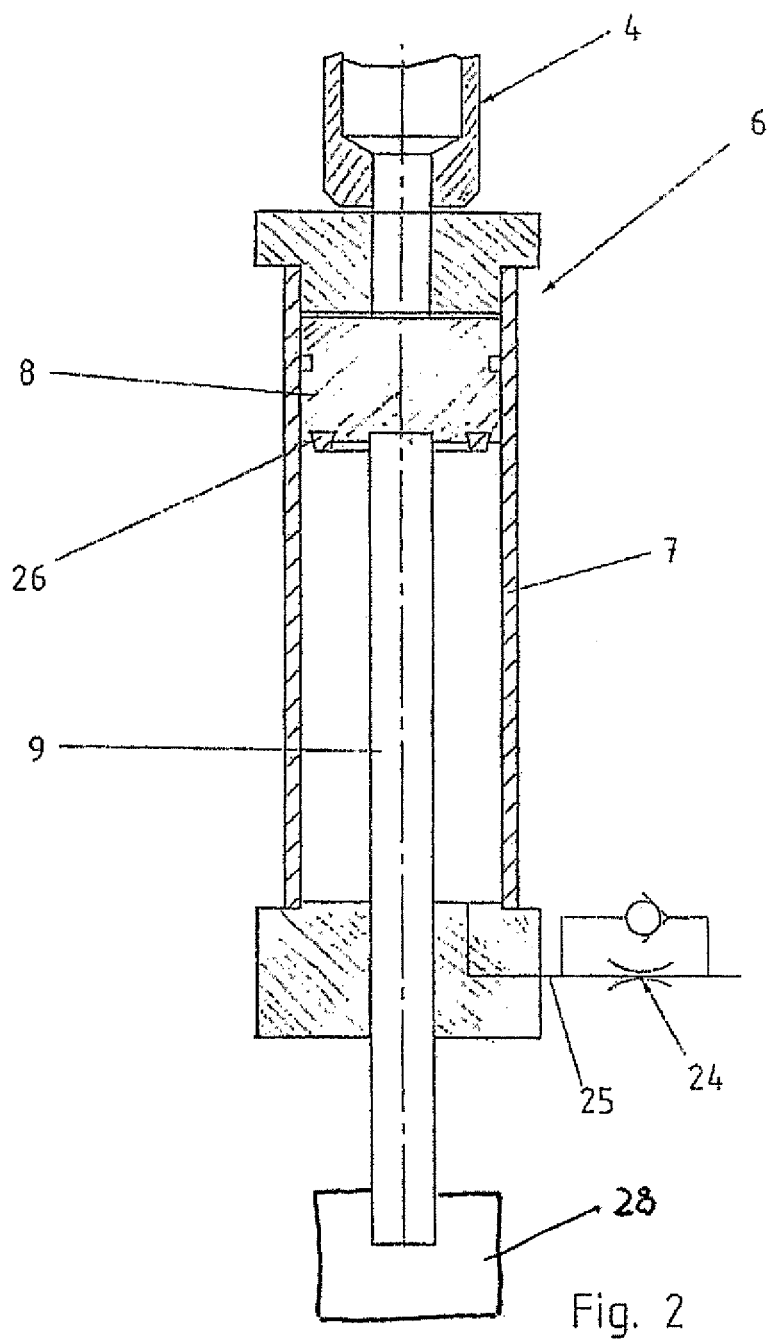
FIG. 2 is a cross sectional view through a lower portion of the drive of the shutoff fitting, operating an adjustment device.

Turning now to the drawing, and in particular to FIG. 1, there is shown a cross sectional view of an upper portion of a drive for a shutoff fitting according to the present invention, generally designated by reference numeral 1 and including a housing 2 which detachably accommodates a hybrid gas generator 3 as energy supply. The housing 2 is made of two parts and includes a lower housing part 4 which is coupled to an adjustment device 6 via a screw connection 5, as schematically illustrated in FIG. 2, and an upper housing part 18 which is connected to the lower housing part 4 in a manner not shown in greater detail. The upper housing part 18 may, for example, be screwed onto the lower housing part 4. By way of example, the adjustment device 6 involves a piston and cylinder unit. For ease of illustration, the screw connection 5, shown in FIG. 1, has been omitted in FIG. 2 which shows only the lower part of the lower housing part 4 that is coupled to the adjustment device 6.

The adjustment device 6 includes a cylinder 7 and a piston 8 which is arranged in the cylinder 7 and has a piston rod 9 for connection to a shutoff member 28. The shutoff member 28 can be configured as a flat valve or shutoff plate and is provided to inhibit a flow through a conduit for protection purposes, when the upper drive portion of the shuttoff fitting is activated.

FIG. 1 shows purely schematically a trigger 10 which is coupled with the hybrid gas generator 3 via an electric line 11. The electric line 11 is connected to an electric plug connector (not shown) which is received in an open-top receiving space 21 at an upper end of the upper housing part 18.

The circumstances for activating the shutoff fitting 1 are secondary and may involve activation for use as protective device in the presence of a reaction or malfunction or imminent reaction or malfunction.

The hybrid gas generator 3 has in an upper third thereof a reaction chamber 12 which contains a reactive substance (not shown) of the hybrid gas generator 3. The reaction chamber 12 is normally separated from an adjacent compressed gas chamber 14 by a diaphragm 13 on an inlet side. On the outlet side, the compressed gas chamber 14 is closed off by a diaphragm 15. In the event of an electric activation by the trigger 10, the hybrid gas generator 3 is activated to develop gases. Pressure in the reaction chamber 12 rises until the diaphragm 13 is penetrated. As a result, the pressure in the compressed gas chamber 14 rises, causing destruction of the outlet-side diaphragm 15. Compressed gas can now flow via not shown radial outlets in an end cap 16 into an accumulator space 17 which radially surrounds a major part of the end cap 16 on the outside. Thus, hot gases can flow from the accumulator space 17 into the cylinder 7 of the adjustment device 6, shown in FIG. 2, and move the piston 8.

The hybrid gas generator 3 is intended for one time use only. Once activated, it has to be replaced by detaching the upper housing part 18 from the lower housing part 4. As a result, two holding elements 19 in the form of half-shell-shaped clamping jaws become accessible. As shown in FIG. 1, the holding elements 19 are in form-fitting engagement with an outer constriction 20 of the hybrid gas generator 3.

Referring again to FIG. 1, the accumulator space 17 is in fluid communication via a ring channel in circumferential relation to the hybrid gas generator 3 with a control channel 22 which is shown only schematically. In this way, the drive of the shutoff fitting 1 can be operated in addition with compressed air, preferably with pressures from 4 to 6 bar. The control channel 22 is in fluid communication with a feed line 23 in which a non-return valve 27 is disposed to protect against pressure loss in the event the hybrid gas generator 3 is activated.

FIG. 2 further shows a throttle 24 disposed in a vent channel 25 which feeds into the annular space of the piston and cylinder unit as the adjustment device 6. The presence of the throttle 24 allows buildup and setting of a resistance pressure to provide a pneumatic brake for the piston 8 and thus to prevent the piston 8 to impact unimpededly an end stop of the adjustment device 6 in the event the hybrid gas generator 3 is activated. The throttle 24 is configured as a one-way throttle, as shown by the indicated symbol in FIG. 2. Dampers 26 may further be provided in the piston 8 to attenuate the movement of the piston 8 when impacting the end stop. As shown by way of example in FIG. 2, a single circumferential elastomeric ring is provided at a distance to the piston rod 9 in the area of the annular space of the piston 8.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A shutoff fitting as a protection device for blocking a fluid flow through a conduit, comprising:
    a pneumatic adjustment device including a shutoff member;
    a separate hybrid gas generator operably connected to the adjustment device, said hybrid gas generator having a reaction chamber with a gas generator and a pressure gas chamber containing compressed gas and arranged adjacent to the reaction chamber;
    an inlet diaphragm separating the reaction chamber from the pressure gas chamber and penetratable, when the gas generator is activated, so that a passage is established from the reaction chamber to the pressure gas chamber and the pressure in the pressure gas chamber rises;
    an outlet diaphragm closing the pressure gas chamber and rendered ineffective through destruction when the gas generator is activated and the inlet diaphragm is penetrated and the pressure in the pressure gas chamber rises, to enable compressed gas to flow into the adjustment device which is separate from the hybrid gas generator and to move the shutoff member; and
    a pressure source configured to activate the adjustment device independently of the hybrid gas generator.

2. The shutoff fitting of claim 1, wherein the pneumatic adjustment device is configured as a piston and cylinder unit.

3. The shutoff fitting of claim 2, wherein the piston and cylinder unit has a cylinder provided with a vent channel, further comprising a throttle disposed in the vent channel and operating as a brake for a piston of the piston and cylinder unit.

4. The shutoff fitting of claim 3, wherein the throttle is constructed to allow buildup of a resistance pressure of at least 2.5 bar.

5. The shutoff fitting of claim 1, further comprising a housing having an accumulator space for receiving gas exiting the hybrid gas generator, said hybrid gas generator being constructed as pre-configured assembly detachably installed in the housing.

6. The shutoff fitting of claim 5, wherein the hybrid gas generator has an outer constriction, further comprising a formfitting holding element engaging the constriction for detachable coupling the hybrid gas generator with the housing.

* * * * *